(12) United States Patent
Kuo

(10) Patent No.: US 7,068,636 B2
(45) Date of Patent: Jun. 27, 2006

(54) METHOD FOR DETERMINING RLC ENTITY RE-ESTABLISHMENT DURING SRNS RELOCATION

(75) Inventor: Lee-Chee Kuo, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 886 days.

(21) Appl. No.: 10/064,202

(22) Filed: Jun. 21, 2002

(65) Prior Publication Data

US 2004/0203971 A1 Oct. 14, 2004

(51) Int. Cl.
*H04Q 7/24* (2006.01)
(52) U.S. Cl. ........................................ 370/338; 370/466
(58) Field of Classification Search ................ 370/331, 370/338, 466
See application file for complete search history.

(56) References Cited

U.S. PATENT DOCUMENTS

2002/0107019 A1* 8/2002 Mikola et al. ............... 455/436
2003/0003919 A1* 1/2003 Beming et al. .............. 455/446

FOREIGN PATENT DOCUMENTS

WO  WO-00/54521 A2  9/2000
WO  WO-01/39534 A1  5/2001

OTHER PUBLICATIONS

ETSI TS 125 303 V3.6.0 (Dec. 2000); pp. 60-65.
ETSI TS 125 331 V3.1.0 (Jan. 2000); Universal Mobile Telecommunications System (UMTS); RRC Protocol Specification (3G TS 125.331 version 3.1.0 release 1999).
3GPP TS 25.331 V3.10.0 (Mar. 2002) 3rd Generation Partnership Project; Technical Specification Group Radio Access Network; Radio Resource Control (PRC); Protocol Specification (Release 1999).
3GPP TS 25.322 V3.10.0 (Mar. 2002) 3rd Generation Partnership Project; Technical Specification Group Radio Access Network; Radio Link Control (RLC) protocol Specification (Release 1999).
ETSI TS 125 303 V3.6.0 (Dec. 2000), Universal Mobile Telecommunication System (UMTS); Interlayer Procedures in Connected Mode (3G TS 25.303 Version 3.6.0 Release 1999), pp. 60-65.

(Continued)

*Primary Examiner*—Derrick Ferris
(74) *Attorney, Agent, or Firm*—Winston Hsu

(57) ABSTRACT

A wireless communications device supports a Radio Resource Control (RRC) layer having a plurality of states, which include states in which no uplink communications is possible with a base station. The RRC layer receives a reconfiguration procedure from the base station that initiates a base station relocation procedure for the wireless device. The wireless device transmits confirmation information to the base station in response to the reconfiguration procedure. The RRC layer receives acknowledgement that the base station successfully received the confirmation information. Finally, while in one of the previously mentioned states, and in response to the acknowledgement, the RRC layer re-establishes a Radio Link Control (RLC) entity supported by the wireless device to effect the base station relocation procedure. In another embodiment, the RRC layer re-establishes the RLC entity when transitioning to a state in which uplink activity is possible.

7 Claims, 7 Drawing Sheets

OTHER PUBLICATIONS

ETSI TS 125 331 V3.1.0 (Jan. 2000), Universal Mobile Telecommunication System (UMTS); RRC Protocol Specification (3G TS 25.331 Version 3.1.0 Release 1999), pp. 1-282.

* cited by examiner

METHOD FOR DETERMINING RLC ENTITY RE-ESTABLISHMENT DURING SRNS RELOCATION

BACKGROUND OF INVENTION

1. Field of the Invention

The present invention relates to a wireless communications network. In particular, the present invention discloses a method for determining when to establish a RLC entity during a 3GPP SRNS relocation procedure.

2. Description of the Prior Art

Please refer to FIG. 1. FIG. 1 is a simple block diagram of a wireless communication network 10, as defined by the $3^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications network 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN for short. Each RNS 20 comprises one radio network controller (RNC) 22 that is in communications with a plurality of Node Bs 24. Each Node B 24 is a transceiver, which is adapted to send and receive wireless signals, and which defines a cell region. A number of cells (i.e., a number of Node Bs 24) taken together defines a UTRAN Registration Area (URA). In particular, the wireless communications network 10 assigns a mobile unit 40 (generally termed a "UE" for User Equipment) to a particular RNS 20, which is then termed the serving RNS (SRNS) 20s of the UE 40. Data destined for the UE 40 is sent by the CN 30 (or UTRAN 20u) to the SRNS 20s. It is convenient to think of this data as being sent in the form of one or more packets that have a specific data structure, and which travel along one of a plurality of radio bearers (RBs) 28, 48. An RB 28 established on the SRNS 20s will have a corresponding RB 48 established on the UE 40. The RBs are numbered consecutively, from RB0 to RBn. Typically, RB0 to RB4 are dedicated signaling RBs (SRBs), which are used for passing protocol signals between the UTRAN 20u and the UE 40, and will be described in some more detail below. RBs 28, 48 greater than four (i.e., RB5, RB6, etc.) are typically used to carry user data. The RNC 22 utilizes a Node B 24, which is assigned to the UE 40 by way of a Cell Update procedure, to transmit data to, and receive data from, the UE 40. The Cell Update procedure is initiated by the UE 40 to change a cell as defined by a Node B 24, and even to change a URA. Selection of a new cell region will depend, for example, upon the location of the UE 40 within the domain of the SRNS 20s. The UE 40 broadcasts data to the wireless communications network 10, which is then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 22 of the DRNS 20d forwards the received signal to the SRNS 20s. The SRNS 20s uses this forwarded signal from the DRNS 20d, plus the corresponding signals from its own Node Bs 24 to generate a combined signal that is then decoded and finally processed into packet data. The SRNS 20s then forwards the received data to the CN 30. Consequently, all communications between the UE 40 and the CN 30 must pass through the SRNS 20s.

Please refer to FIG. 2 in conjunction with FIG. 1. FIG. 2 is a simple block diagram of a UMTS radio interface protocol architecture, as used by the communications network 10. Communications between the UE 40 and the UTRAN 20u is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the UTRAN 20u is responsible for combining signals received from the DRNS 20d and SRNS 20s. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20u, whereas the C-plane 92 handles transport for signaling data between the UE 40 and the UTRAN 20u. The RRC 80 sets up and configures all RBs 28, 48 between the UTRAN 20u and the UE 40. The PDCP layer 22 provides header compression for Service Data Units (SDUs) received from the U-plane 94. The RLC layer 72 provides segmentation of PDCP 70 SDUs and RRC 80 SDUs into RLC protocol data units (PDUs), and under acknowledged mode (AM) transfers, can provide upper layers (such as the PDCP layer 70 or the RRC layer 80) with a confirmation that RLC PDUs have been successfully transmitted and received between the UTRAN 20u and the UE 40. The MAC layer 74 provides scheduling and multiplexing of RLC PDUs onto the transport channel, interfacing with the physical layer 60.

Before proceeding, it is worth taking note of terminology used in the following. An SDU is any packet that is received from an upper layer or passed to an upper layer, whereas a PDU is a packet generated by a layer and passed on to a lower layer or received from a lower layer. Hence, a PDCP PDU is an RLC SDU. Similarly, an RLC PDU is a MAC SDU, and so forth. Generally, a PDU is formed by adding a header to SDU data received from an upper layer, or by internally generating a packet for layer-to-layer communications between the UE 40 and the UTRAN 20u. Of particular relevance to the present invention is the RLC layer 72 in the layer 2 stack. The RLC layer 72 generates RLC PDUs of a fixed size that is determined by the MAC layer 74, and sends these RLC PDUs to the MAC layer 74 for transmission, or receives RLC PDUs from the MAC layer 74. Each RLC PDU explicitly carries an n-bit sequence number in its header that identifies the sequential position of that RLC PDU in a stream of RLC PDUs, and which thus enables RLC PDUs to be assembled in their proper order to form RLC SDUs (i.e., PDCP PDUs, or RRC PDUs). The RLC layer 72 is composed of one or more RLC entities 76. Each RLC entity 76 is individually associated with an RB 28, 48. For an RB 28 on the UTRAN 20u side, there exists an RLC entity 76 dedicated solely to that RB 28. For the same RB 48 on the UE 40 side, there similarly exists a corresponding RLC entity 76. These two corresponding RLC entities 76 for the same RB 28, 48 are termed "RLC peer entities". The value of "n" for the n-bit sequence numbers carried within the headers of the RLC PDUs will depend on the transport mode utilized between the RLC peer entities 76. For example, in AM transmissions, in which the RLC peer entities 76 acknowledge each RLC PDU successfully received, n is 12. In other transport modes, n is 7. For communications between the UTRAN 20u and the UE 40 to be successful, it is essential that the RLC peer entities 76 be properly synchronized with each other. In particular, each RLC entity 76 contains two hyperframe numbers (HFNs): a receiving HFN (rHFN) 76r, and a transmitting HFN (tHFN)

76t. The tHFN 76t and rHFN 76r are used for encryption and decryption of packet data, respectively. For this encryption/decryption process to be successful, RLC peer entities 76 must have synchronized rHFN 76r and tHFN 76t values. In particular, the rHFN 76r of one RLC entity 76 must be identical to the tHFN of its RLC peer entity 76, and vice versa. As RLC PDUs are transmitted by an RLC entity 76, the tHFN 76t steadily increases in value. As RLC PDUs are received by an RLC entity 76, the rHFN 76r steadily increases in value. The rHFN 76r counts how many times rollover is detected in the sequence numbers of received RLC PDUs. The tHFN counts how many times rollover is detected in the sequence numbers of transmitted RLC PDUs. The HFNs 76r, 76t may thus be thought of as non-transmitted high-order bits of the RLC PDU sequence numbers, and it is essential that these HFNs 76r, 76t are properly synchronized on the RLC peer entities 76.

It is the RRC layer 80 that is responsible for the establishment and configuring of the RBs 28, 48. The RRC layer 80 has various operational states that affect how the RRC layer 80 behaves. Please refer to FIG. 3 with reference to FIG. 1 and FIG. 2. FIG. 3 is a state diagram of the RRC layer 80. The RRC layer 80 has two primary states: an idle mode 81 and a UTRA RRC Connected Mode 86. While in idle mode, the RRC layer 80 has no lines of communication open with its peer RRC layer 80. That is, there are no available SRBs 28, 48 that enable communications between peer entity RRC layers 80, except for RB0, which is a common channel available to all UEs 40 in the UTRAN 20u. Utilizing the UE 40 as an example platform, once the RRC layer 80 of the UE 40 establishes a connection (i.e., an SRB 28, 48) with its peer RRC layer 80 on the UTRAN 20u, the RRC layer 80 of the UE 40 switches into the UTRA RRC Connected Mode 86. This connection is typically initiated along RB0, which is a shared channel. Internally, the UTRA RRC Connected Mode 86 has four unique states: CELL_DCH 82, CELL_FACH 83, CELL_PCH 84 and URA_PCH 85. The CELL_DCH state 82 is characterized in that a dedicated channel is allocated to the UE 40 for uplink (UE 40 to UTRAN 20u) and downlink (UTRAN 20u to UE 40) communications. The CELL_FACH state 83 is characterized in that no dedicated channel is allocated to the UE 40, but instead the UE 40 is assigned a default common or shared transport channel for uplink. The CELL_PCH state 84 is characterized in that no dedicated physical channel is allocated to the UE 40, no uplink activity is possible for the UE 40, and the position of the UE 40 is known by the UTRAN 20u on a cell level (i.e., a node B basis 24). The URA_PCH state 85 is characterized in that no dedicated physical channel is allocated to the UE 40, no uplink activity is possible for the UE 40, and the position of the UE 40 is known by the UTRAN 20u on a URA basis.

A number of reconfiguration procedures are available to the RRC layer 80 to setup and configure RBs 28, 48. These procedures involve the UTRAN 20u sending a specific message to the UE 40 along an RB 28, 48, and the UE 40 responding in turn with a corresponding message. Typically, the message is sent along RB2, which is an SRB. The messages include Radio Bearer Setup, Radio Bearer Reconfiguration, Radio Bearer Release, Transport Channel Reconfiguration and Physical Channel Reconfiguration. For each of these reconfiguration messages, the UE 40 has a corresponding "Complete" or "Failure" response message indicating success or failure of the procedure on the UE 40 side, and which may provide the UTRAN 20u any necessary information for the UTRAN 20u to complete the procedure. The reconfiguration message and the response message may all carry optional information elements (IEs), which are fields of data that hold ancillary information. In addition to these reconfiguration procedures, there also exists a Cell Update procedure, which originates with a Cell Update message from the UE 40 and which is responded to by the UTRAN 20u. The Cell Update procedure is used by the UE 40 to indicate a change of cell location (i.e., Node B 24), of URA, or connection state 82, 83, 84 and 85.

As the UE 40 moves closer towards the domain of the DRNS 20d, a decision is eventually made by the UTRAN 20u to place the UE 40 under the DRNS 20d, and a transfer process is enacted so that the DRNS 20d will become the new SRNS 20s of the UE 40. This process is termed an SRNS relocation procedure. The SRNS relocation procedure may be combined with any of the previously noted RRC procedures. In particular, by including a "New U-RNTI" IE in with a Radio Bearer Reconfiguration message, an SRNS relocation procedure is triggered. For the other procedures (Radio Bearer Setup, Radio Bearer Release, Transport Channel Reconfiguration, Physical Channel Reconfiguration and Cell Update), inclusion of a "Downlink counter synchronization info" IE will trigger SRNS relocation.

When receiving a reconfiguration message (which is sent from the SRNS 20s along RB2 28) that indicates that SRNS relocation is to be performed, the UE 40 re-establishes the RLC entity 76 of RB2 48, and re-initializes the rHFN 76r and the tHFN 76t for RB2 48. The RLC entity 76 for RB2 48 is re-established with a peer entity 76 on the DRNS 20d, which will serve as the new SRNS 20s for the UE 40. The new values for the rHFN 76r and tHFN 76t for RB2 48 are given by the equation: MAX(rHFN of RB2, tHFN of RB2)+1, where MAX(a, b) selects the larger of a or b. The UE 40 then calculates a START value for each CN 30 domain and includes these START values in a "START list" IE within the response message. START values are used to initialize the rHFNs 76r and tHFNs 76t of all other RBs 48, 28 except RB0. The START value used to initialize the rHFN 76r, tHFN 76t of an RB 48, 28 depends upon the domain with which the particular RB 48, 28 is associated. Currently, there are two domains: a packet switching (PS) domain 30p, and a circuit switching (CS) domain 30c. Hence, the START list IE currently contains two values: a START value for the PS domain 30p, and a START value for the CS domain 30c. The UE 40 then transmits the response message, which contains the START list IE, to the UTRAN 20u along RB2 48. The RLC entity 76 of RB2 48 is an AM connection, and so the RRC layer 80 of the UE 40 is able to know if the UTRAN 20u has successfully received the response message, as the RLC entity 76 will so inform the RRC layer 80. After the RLC layer 76 of RB2 48 has confirmed the successful transmission of the response message, and if the new state of the RRC layer 80 of the UE 40 is the CELL_DCH state 82 or the CELL_FACH state 83, the RRC layer 80 of the UE 40 re-establishes the RLC entities 76 for all other RBs 48 (except RB0, which is the common channel), and re-initializes the rHFN 76r and tHFN 76t of these RBs 48 with the appropriate START value that was included in the response message to the UTRAN 20u.

Because the RBs 48 are re-established only if the new state of the RRC layer 80 is the CELL_DCH state 82 or the CELL_FACH state 83 when confirmation to the response message is received, problems may arise if the SRNS relocation procedure is performed and the UE 40 slips into the CELL_PCH state 85 or URA_PCH state 84. This problem may occur due to the periodic nature in which the Cell Update procedure is performed by the UE 40. In the event that the new state of the RRC layer 80 of the UE 40 is one of the CELL_PCH 85 or URA_PCH 84 states during the SRNS relocation procedure, the RLC entities 76 of the other RBs 48 (i.e., RB1, RB3, RB4, . . . , RBn) will not be re-established, nor will their HFN values 76r, 76t be re-initialized. As a result, once the RRC layer 80 of the UE 40 transitions back into either the CELL_DCH state 82 or the CELL_FACH state 83, these RLC entities 76 will not be properly synchronized with their RLC peer entities 76 on the UTRAN 20u side. This lack of synchronization will cause the ciphering/deciphering process to break down, and consequently communications along these RBs 28, 48 will no longer be functional.

SUMMARY OF INVENTION

It is therefore a primary objective of this invention to provide a method for determining RLC entity re-establishment during an SRNS relocation procedure.

Briefly summarized, the preferred embodiment of the present invention discloses a method for determining the re-establishment of a Radio Link Control (RLC) entity in a wireless communications device undergoing a Serving Radio Network Subsystem (SRNS) relocation procedure with a Universal Terrestrial Radio Access Network (UTRAN). The wireless communications device supports a Radio Resource Control (RRC) layer having a plurality of states, which include a CELL_PCH state and a URA_PCH state in which no uplink communications are possible with the UTRAN. The RRC layer receives a reconfiguration procedure from the UTRAN that initiates a SRNS relocation procedure for the wireless device. The wireless device transmits confirmation information to the UTRAN in response to the reconfiguration procedure. The RRC layer receives acknowledgement that the UTRAN successfully received the confirmation information. Finally, while in the CELL_PCH state or the URA_PCH state, and in response to the acknowledgement, the RRC layer re-establishes a RLC entity supported by the wireless device to effect the SRNS relocation procedure. In another embodiment, the RRC layer re-establishes the RLC entity when transitioning to a state in which uplink activity is possible.

It is an advantage of the present invention that by performing re-establishment of radio bearers while in the CELL_PCH or URA_PCH state, the present invention method ensures that the SRNS relocation procedure is fully and properly completed. In particular, the present invention ensures that the UE RLC entities remain synchronized with their respective RLC peer entities in the UTRAN.

These and other objectives of the present invention will no doubt become obvious to those of ordinary skill in the art after reading the following detailed description of the preferred embodiment, which is illustrated in the various figures and drawings.

DETAILED DESCRIPTION

In the following description, user equipment (UE) is a wireless communications device, and may be a mobile telephone, a handheld transceiver, a personal data assistant (PDA), a computer, or any other device that requires a wireless exchange of data. It is assumed that this wireless exchange of data conforms to 3GPP-specified protocols. It should be understood that many means may be used for the physical layer to effect wireless transmissions, and that any such means may be used for the system hereinafter disclosed.

Figure 3:
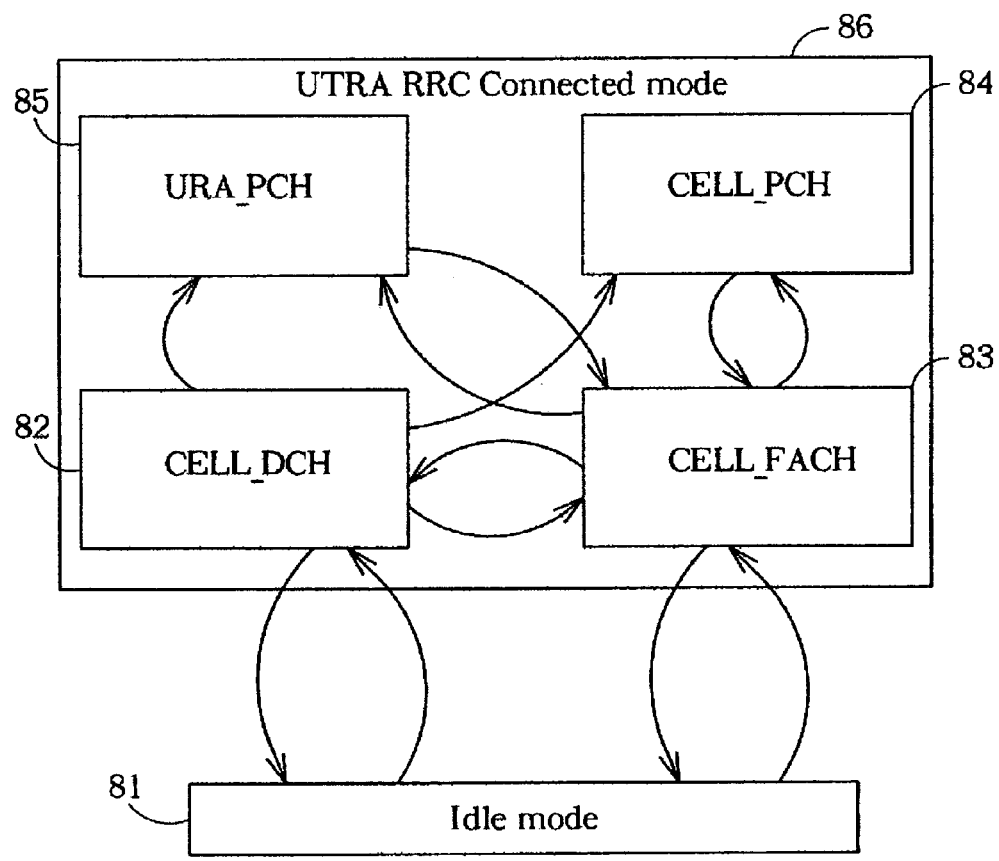
FIG. 3 is a state diagram of a Radio Resource Control (RRC) RRC layer shown in FIG. 2.
Figure 4:
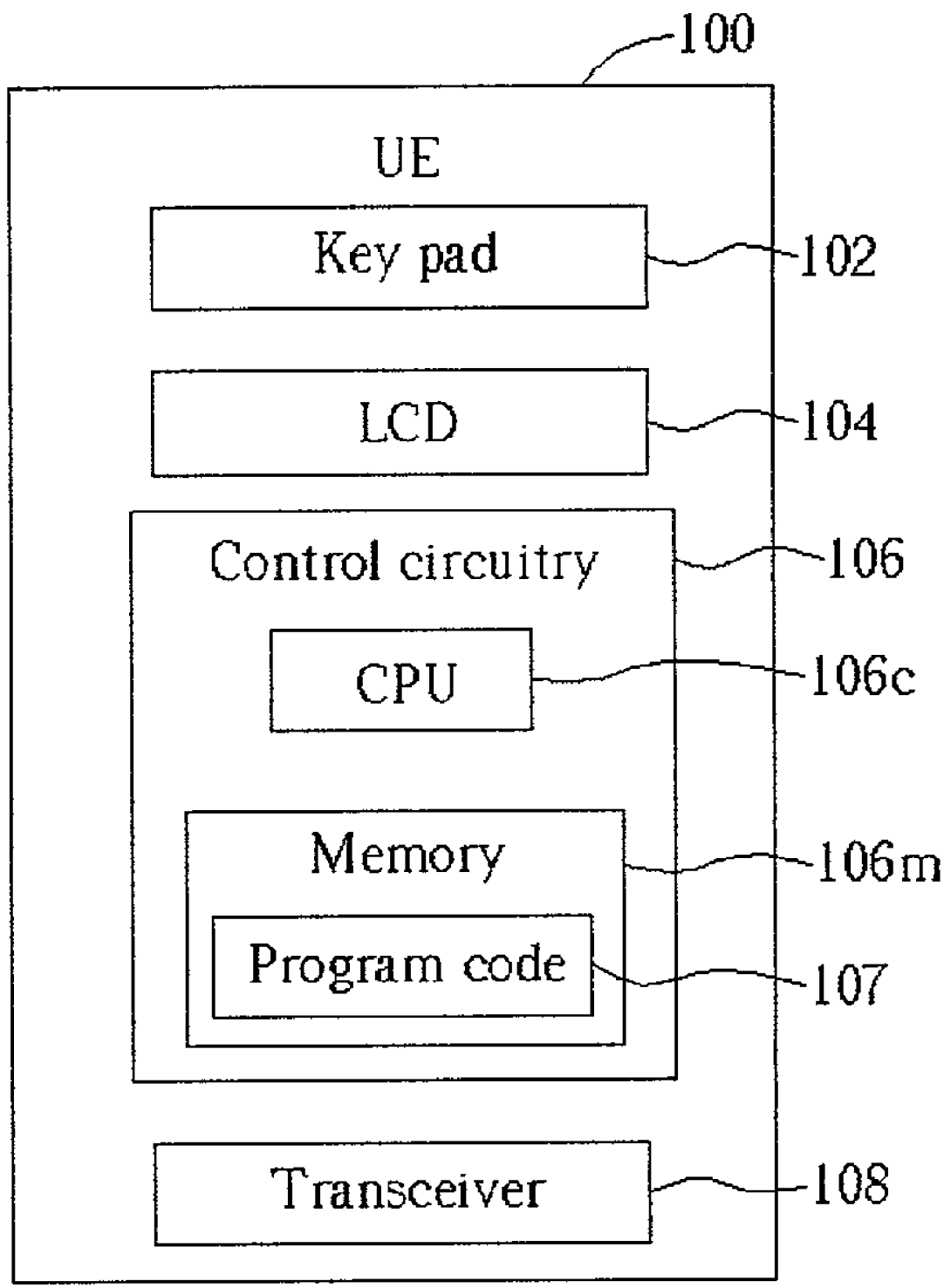
FIG. 4 is a block diagram of a wireless device according to the present invention.

Please refer to FIG. 4. FIG. 4 is a block diagram of a wireless device according to the present invention, hereinafter termed a UE 100. In most respects, the present invention UE 100 is identical to the UE 40 of the prior art. As such, FIG. 2 and FIG. 3, which illustrate general aspects of the 3GPP communications protocol, are also suitable for providing illustration of the present invention method. The UE 100 includes devices for accepting input and providing output, such as a keypad 102 and a liquid crystal display (LCD) 104, respectively. A transceiver 108 is capable of receiving wireless signals and providing corresponding data to a control circuit 106, and can also wirelessly transmit data received from the control circuit 106. The transceiver 108 is thus part of the layer 1 stack 60 of the present invention communications protocol. The control circuitry 106 is responsible for controlling the operations of the UE 100, and is used to implement the layer 2 and layer 3 stacks of the communications protocol. To this end, the control circuitry 106 includes a central processing unit (CPU) 106c in electrical communication with memory 106m, an arrangement familiar to those in the art of wireless communication devices. The memory 106 m holds program code 107 that is used to implement the layer 2 and layer 3 stacks of the present invention communications protocol. With respect to the UE 40 of the prior art, the present invention UE 100 has modifications to the program code 107 to implement the present invention method. These modifications should be well within the means of one reasonably skilled in the art after reading the following detailed description of the preferred embodiment.

Figure 1:
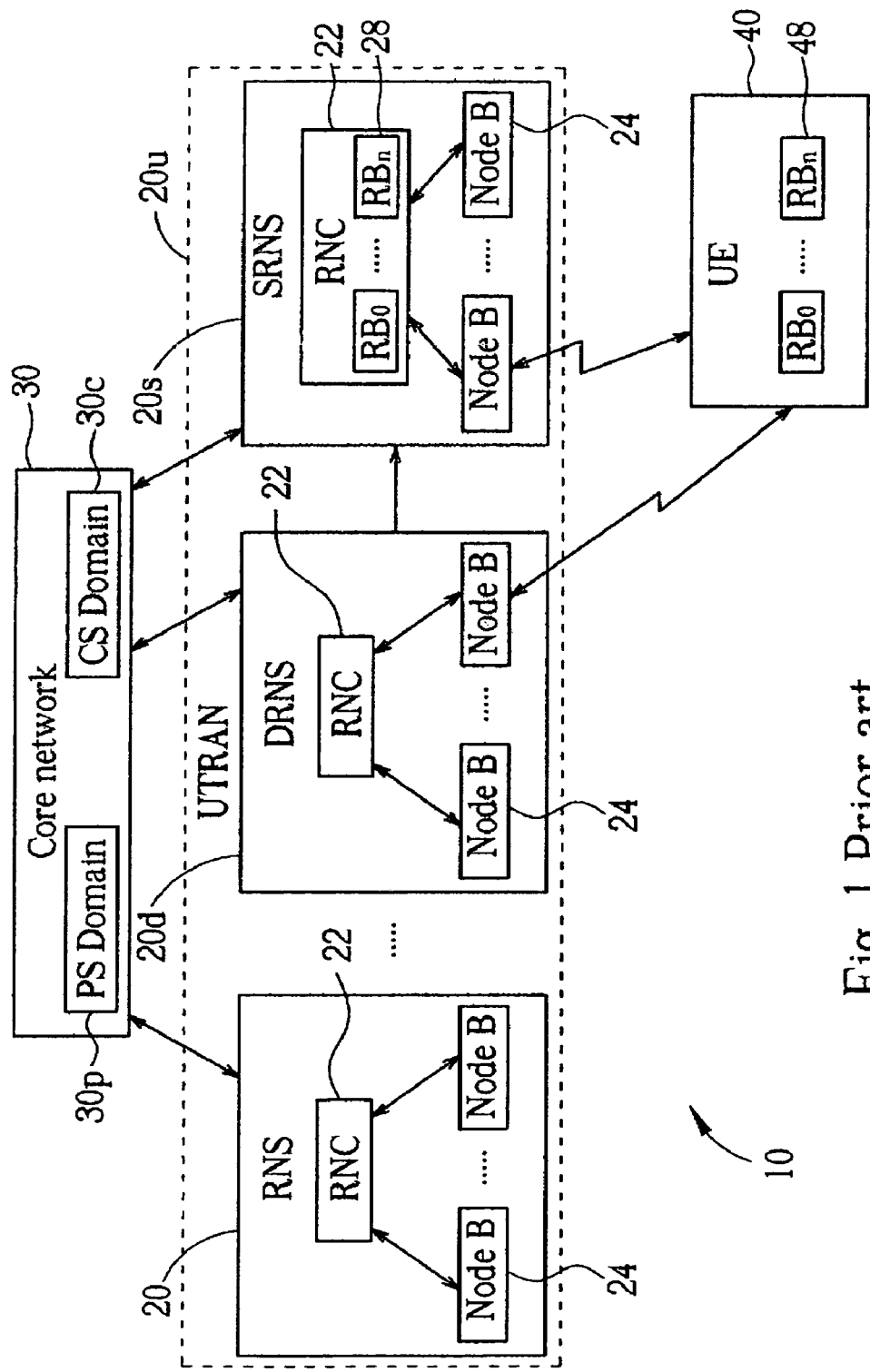
FIG. 1 is a simple block diagram of a wireless communications system.
Figure 2:
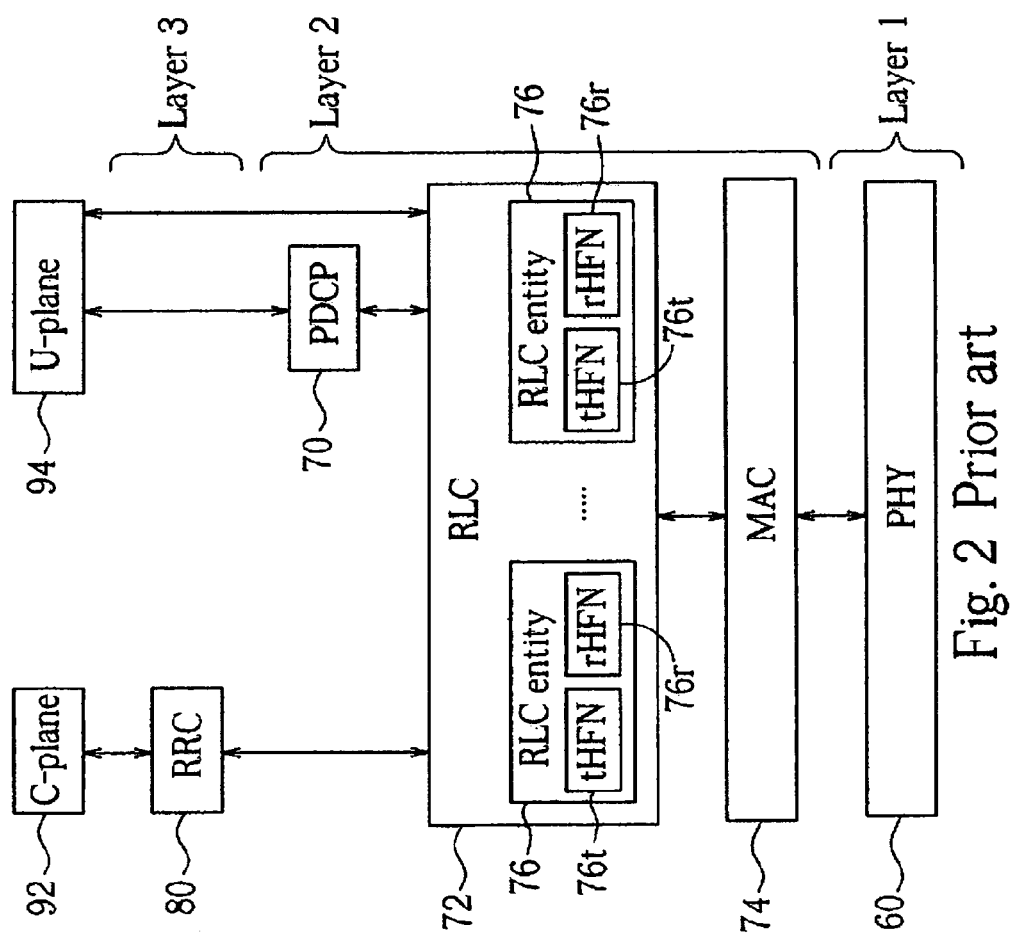
FIG. 2 is a simple block diagram of a UMTS radio interface protocol architecture.
Figure 5:
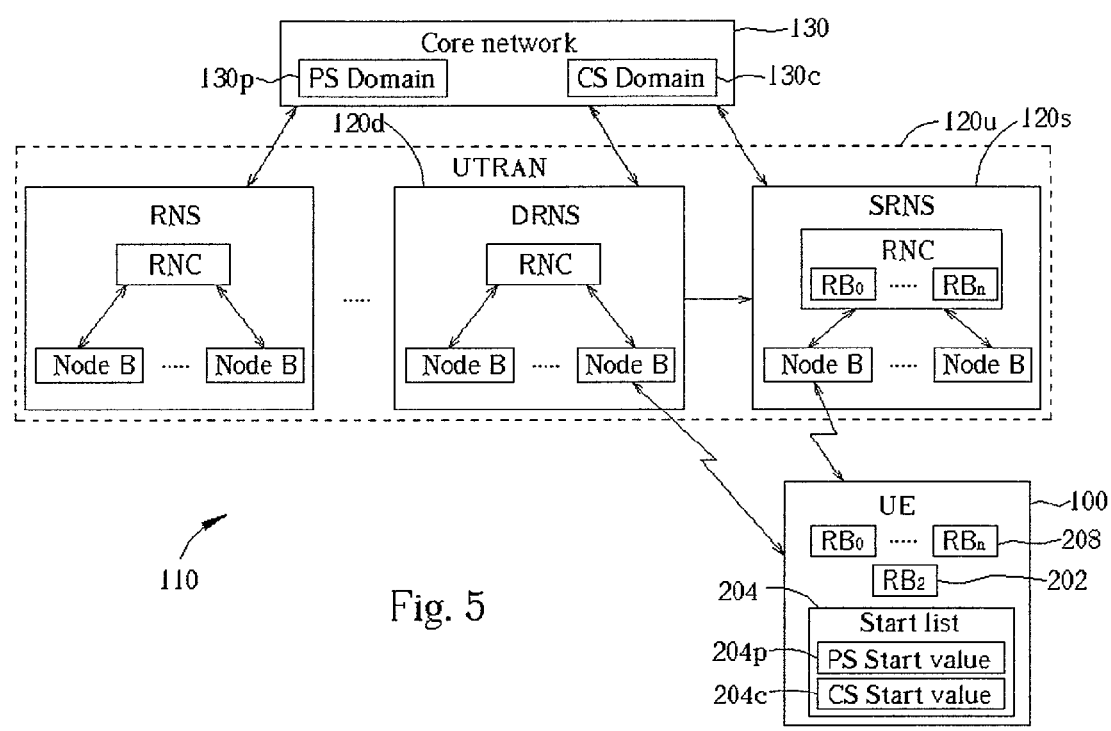
FIG. 5 is a simple block diagram of a UE of FIG. 4 within a wireless communications system.

Please refer to FIG. 5 with reference to FIG. 2 to FIG. 4. FIG. 5 is a simple block diagram of the UE 100 within a wireless communications system 110. The wireless communications system 110 includes a UTRAN 120u in communications with a core network 130. The UTRAN 120u and the core network 130 are functionally identical to those of the prior art. Initially, the UE 100 is in communications with a SRNS 120s via a plurality of radio bearers 208, RB0 thru RBn (as supported by the program code 107). In particular, the UE 100 has established RB2 202 with the SRNS 120s. As the UE 40 moves closer towards the domain of a DRNS 120d, a decision is eventually made by the UTRAN 120u to place the UE 100 under the DRNS 20d, and an SRNS relocation procedure is started. As previously noted, the SRNS relocation procedure may be combined with other RRC 80 procedures, such as by including a "New U-RNTI" IE in with a Radio Bearer Reconfiguration message, or including a "Downlink counter synchronization info" IE in with Radio Bearer Setup, Radio Bearer Release, Transport Channel Reconfiguration, Physical Channel Reconfiguration and Cell Update messages. When the RRC layer 80 of the UE 100 receives a reconfiguration message indicating that SRNS relocation is to be performed, the RRC layer 80 on the UE 100 begins the SRNS relocation procedure. In response to the SRNS procedure, the UE 100 generates a START list 204 that is used to set the tHFNs 76$t$ and rHFNs 76$r$ of the RBs 208 after re-establishment of the UE 100 RLC entities 76 with the DRNS 120$d$. In particular, the START list 204 includes a PS START value 204$p$ that is used for RBs 208 in the PS domain 130$p$, and a CS START value 204$c$ that is used for RBs 208 in the CS domain 130$c$. The tHFN 76$t$ and rHFN 76$r$ of RB2 202, however, are not set in this manner. Instead, the greater of the two are used to set both values 75$r$, 76$t$. As a step in the SRNS procedure, before releasing any other RLC entities 76, the UE 100 first releases the RLC entity 76 for RB2 202, and then re-establishes the RLC entity 76 for RB2 202 with the DRNS 120$d$. The UE 100 sets the tHFN 76$t$ and the rHFN 76$r$ of the RB2 202 RLC entity 76 to one greater than the maximum value reached by either in the prior RB2 202 RLC entity 76. The UE 100 thus establishes an RLC peer entity 76 with the DRNS 120$d$, and the DRNS, aware of this procedure, similarly synchronizes the tHFN 76$t$ and rHFN 76$r$ of its RLC peer entity 76 for RB2. The SRNS 120$s$ passes relocation information to the DRNS 120$d$ to make this synchronization possible. After re-establishing RB2 202 with the DRNS 120$d$, the UE 100 composes a reply to the reconfiguration message, including the START list 204 in the reply, and transmits the reply along RB2 202 to the UTRAN 120$u$. Hence, it is the DRNS 120$d$ that receives the reply, and the included START list 204, which is sent in response to the original reconfiguration message. At this time, the RRC layer 80 of the UE 100 is in the CELL_DCH state 82 or the CELL_FACH state 83, and usually remains so. Under such conditions, the re-establishment of the remaining RLC entities 76 by the UE 100 conforms to the prior art. However, it is possible for the RRC layer 80 to transition into either the CELL_PCH state 84 or the URA_PCH state 85 after sending the reply to the reconfiguration message. This may occur, for example, due to the periodic nature in which the Cell Update procedure is performed by the UE 100, compounded with the fact that the U-plane 94 has been relatively idle for some time, as it is possible for the reconfiguration message to tell the RRC layer 80 of the UE 40 to move into the CELL_PCH state 85 or the URA_PCH state 84. Under this condition, the new state of the UE 40 RRC layer 76 will not be the CELL_FACH state 83 or the CELL_DCH state 82, and the present invention method must be used to ensure proper re-establishment of the remaining RLC entities 76.

Figure 6:
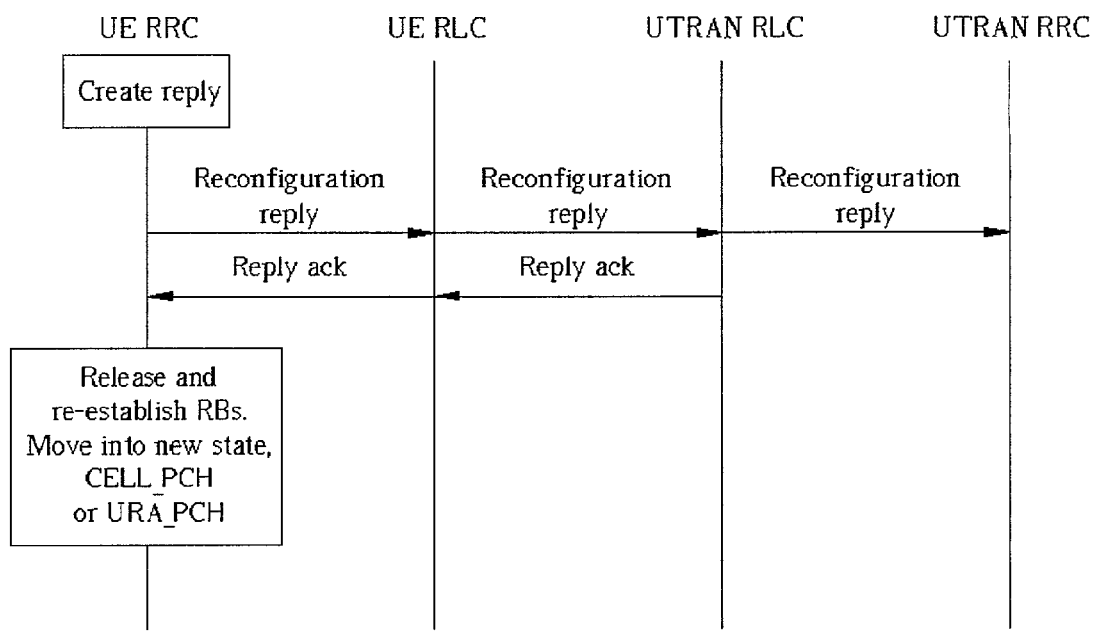
FIG. 6 is a message sequence chart of a first embodiment of the present invention method.

The RLC entity 76 for RB2 202 will inform the RRC layer 80 that the reply to the reconfiguration message has been successfully received by the UTRAN 120$u$, and in response to this the RRC layer 80 of the UE 100 transitions into either the URA_PCH state 85 or the CELL_PCH state 84. One of two embodiments of the present invention method may then be employed to properly re-establish the remaining RBs 208, and hence facilitate completion of the SRNS relocation procedure. Please refer to FIG. 6 with reference to FIGS. 2 to 5. FIG. 6 is a message sequence chart of the first embodiment of the present invention method. In the first embodiment, after confirmation from the RLC entity 76 of RB2 202 that the reply was successfully received by the UTRAN 120$u$ ("reply ack" in FIG. 6), the RRC layer 80 of the UE 100 releases the RLC entities 76 of all remaining RBs 208, excepting RB0. Hence, the RLC entities 76 for RB1, RB3, RB4, . . . , RBn are released. These RLC entities 76 are then re-established with the DRNS 120$d$, despite the fact that the new state of the RRC layer 80 is either the URA_PCH state 85 or the CELL_PCH state 84, or they may be re-established just prior to the RRC layer 80 transitioning into the new state. The tHFNs 76$t$ and rHFNs 76$r$ of the newly established RLC entities 76 are set according to the START list 204, depending upon the domain with which the RB 208 is associated. The DRNS 120$d$, having the same START list 204 as received from the reply, similarly applies the START values 204$p$, 204$c$ to the corresponding RLC peer entities 76. Establishment and synchronization of the peer entities 76 is thus ensured, and hence when the RRC layer 80 of the UE 100 transitions back into either the CELL_DCH state 82 or the CELL_FACH state 83, communications between the UE 100 and the UTRAN 120$u$ will be properly performed.

Figure 7:
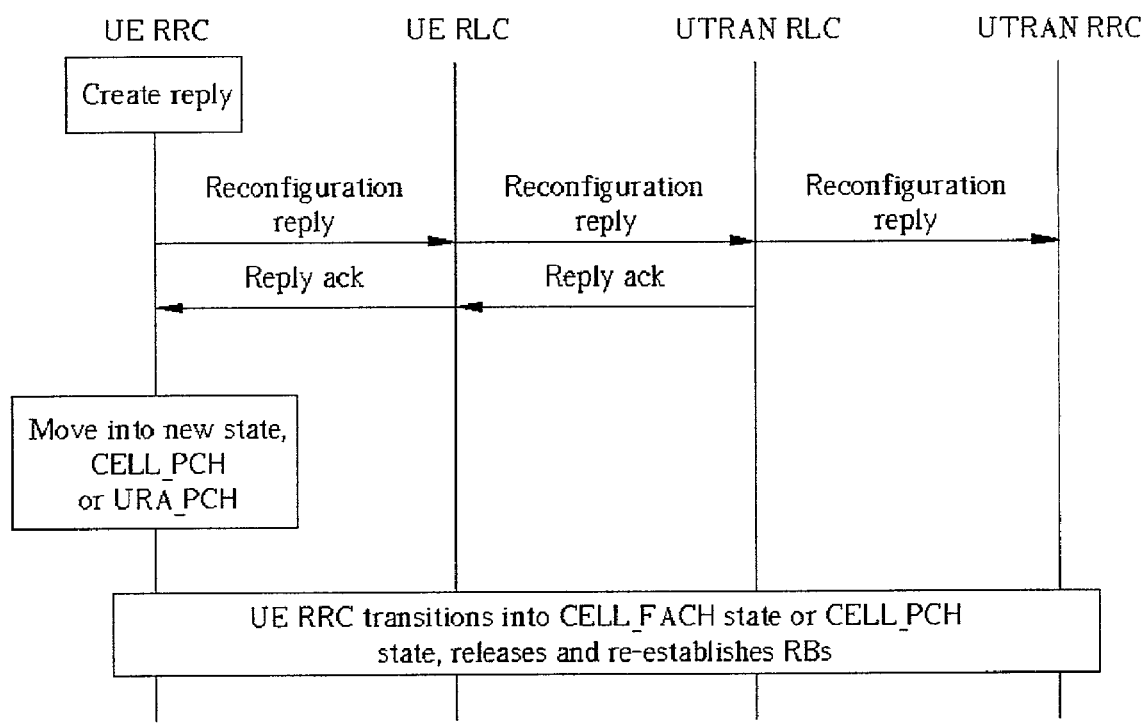
FIG. 7 is a message sequence chart of a second embodiment of the present invention method.

Please refer to FIG. 7 with reference to FIGS. 2 to 5. FIG. 7 is a message sequence chart of the second embodiment of the present invention method. In the second embodiment, the RRC layer 80 of the UE 100 obtains confirmation from the RLC entity 76 of RB2 202 that the reply was successfully received by the UTRAN 120$u$. This confirmation is received while the RRC layer 80 is in either the CELL_FACH state 83 or the CELL_DCH state 82, and in response to this the RRC layer 80 moves into a new state that is either the CELL_PCH state 84 or the URA_PCH state 85. However, the RRC layer 80 does not immediately release and re-establish the remaining RLC entities 76. Instead, the RRC layer 80 waits until the RRC layer 80 transitions back into the either the CELL_DCH state 82 or the CELL_FACH state 83. This transitioning typically occurs in response to a Cell Update message from the UTRAN 20$u$. Upon transitioning into either the CELL_DCH state 82 or the CELL_FACH state 83 from the URA_PCH state 85 or the CELL_PCH state 84, and in response to the confirmation of the reply being received ("reply ack" in FIG. 7), the RRC layer 80 of the UE 100 releases the remaining RLC entities 76 (excepting RB0) and then re-establishes the RLC entities 76 with the DRNS 120$d$. Hence, the RLC entities 76 for RB1, RB3, RB4, . . . , RBn are released and then re-established. The tHFNs 76$t$ and rHFNs 76$r$ of the newly established RLC entities 76 are set by the UE 100 according to the START list 204. Re-establishment of the RLC entities 76 may be done prior to transitioning into the CELL_FACH state or the CELL_DCH state, or after transitioning into the state.

It should be noted that the above description is taken with the assumption that it is the UTRAN 120$u$ that initiates the SRNS relocation procedure by way of a reconfiguration message sent to the UE 100. However, it should be clear to those skilled in the art that the SRNS relocation procedure can also be initiated by the UE 100, by way of a Cell Update message sent to the UTRAN 120$u$. Nevertheless, the teachings of the present invention method are still applicable. That is, re-establishment of the RLC entities 76 can be performed when the resulting state is the CELL_PCH state 84 or the URA_PCH state 85, or when transitioning out of such states.

In contrast to the prior art, the present invention provides for re-establishment and synchronization of RLC entities when in the new state is the URA_PCH state or the CELL_PCH state, or when transitioning out of these states. Consequently, regardless of resulting state of the RRC layer state machine, the RRC layer will continue to properly re-establish and synchronize RLC entities during a SRNS relocation procedure. Communications between the UE and the UTRAN is thus made more reliable.

What is claimed is:

1. A method for determining the re-establishment of a Radio Link Control (RLC) entity in a wireless communications device undergoing a Serving Radio Network Subsystem (SRNS) relocation procedure with a Universal Terrestrial Radio Access Network (UTRAN), the wireless communications device supporting a Radio Resource Control (RRC) layer having a plurality of states that include:
   a CELL_PCH state in which no uplink communications is possible with the UTRAN, and in which the position of the wireless device is known on a cell level; and
   a URA_PCH state in which no uplink communications is possible with the UTRAN, and in which the position of the wireless device is known on a UTRAN Registration Area (URA) level;
   the method comprising:
   receiving, by the RRC layer, a reconfiguration procedure from the UTRAN that initiates a SRNS relocation procedure for the wireless device;
   transmitting, from the wireless device, confirmation information to the UTRAN in response to the reconfiguration procedure;
   receiving, by the RRC layer, acknowledgement that the UTRAN successfully received the confirmation information; and
   in response to the acknowledgement, transitioning, at the RRC layer, into the CELL_PCH state or the URA_PCH state, and re-establishing, by the RRC layer, an RLC entity supported by the wireless device to effect the SRNS relocation procedure.

2. The method of claim 1 further comprising:
   generating, by the wireless device, a START value corresponding to the RLC entity, the RLC entity maintaining a hyperframe number;
   including the START value in the confirmation message; and
   in response to the acknowledgement, assigning, by the wireless device, the START value to the most significant bits of the hyperframe number.

3. The method of claim 1 wherein the RLC entity is re-established before the RRC layer transitions into the CELL_PCH state or the URA_PCH state.

4. The method of claim 1 wherein the RLC entity is re-established after the RRC layer transitions into the CELL_PCH state or the URA_PCH state.

5. A wireless device comprising a central processing unit (CPU) in electrical communications with a memory, the memory comprising program code for implementing the method of claim 1.

6. A method for determining the re-establishment of a Radio Link Control (RLC) entity in a wireless communications device undergoing a Serving Radio Network Subsystem (SRNS) relocation procedure with a Universal Terrestrial Radio Access Network (UTRAN), the wireless communications device supporting a Radio Resource Control (RRC) layer having:
   a CELL_DCH state in which the wireless device is allocated a dedicated channel for uplink communications with the UTRAN;
   a CELL_FACH state in which no dedicated channel is provided for uplink communications with the UTRAN;
   a CELL_PCH state in which no uplink communications is possible with the UTRAN, and in which the position of the wireless device is known on a cell level; and
   a URA_PCH state in which no uplink communications is possible with the UTRAN, and in which the position of the wireless device is known on a UTRAN Registration Area (URA) level;
   the method comprising:
   receiving, by the RRC layer, a reconfiguration procedure from the UTRAN that initiates a SRNS relocation procedure for the wireless device;
   transmitting, from the wireless device, confirmation information to the UTRAN in response to the reconfiguration procedure;
   receiving, by the RRC layer, acknowledgement that the UTRAN successfully received the confirmation information;
   in response to the acknowledgement, transitioning, at the RRC layer, into the CELL_PCH state or the URA_PCH state; and
   subsequent to transitioning into the CELL_PCH state or the URA_PCH state, transitioning, at the RRC layer, to the CELL_DCH state or the CELL_FACH state, and re-establishing a RLC entity supported by the wireless device to effect the SRNS relocation procedure in response to the acknowledgement.

7. The method of claim 6 further comprising:
   generating, at the wireless device, a START value corresponding to the RLC entity, the RLC entity maintaining a hyperframe number;
   including the START value in the confirmation message; and
   in response to the acknowledgement, assigning, by the wireless device, the START value to the most significant bits of the hyperframe number.

* * * * *